Oct. 10, 1944.    F. MARTINDELL    2,360,068
MONITOR CIRCUIT FOR WELDING APPARATUS
Filed Aug. 6, 1942
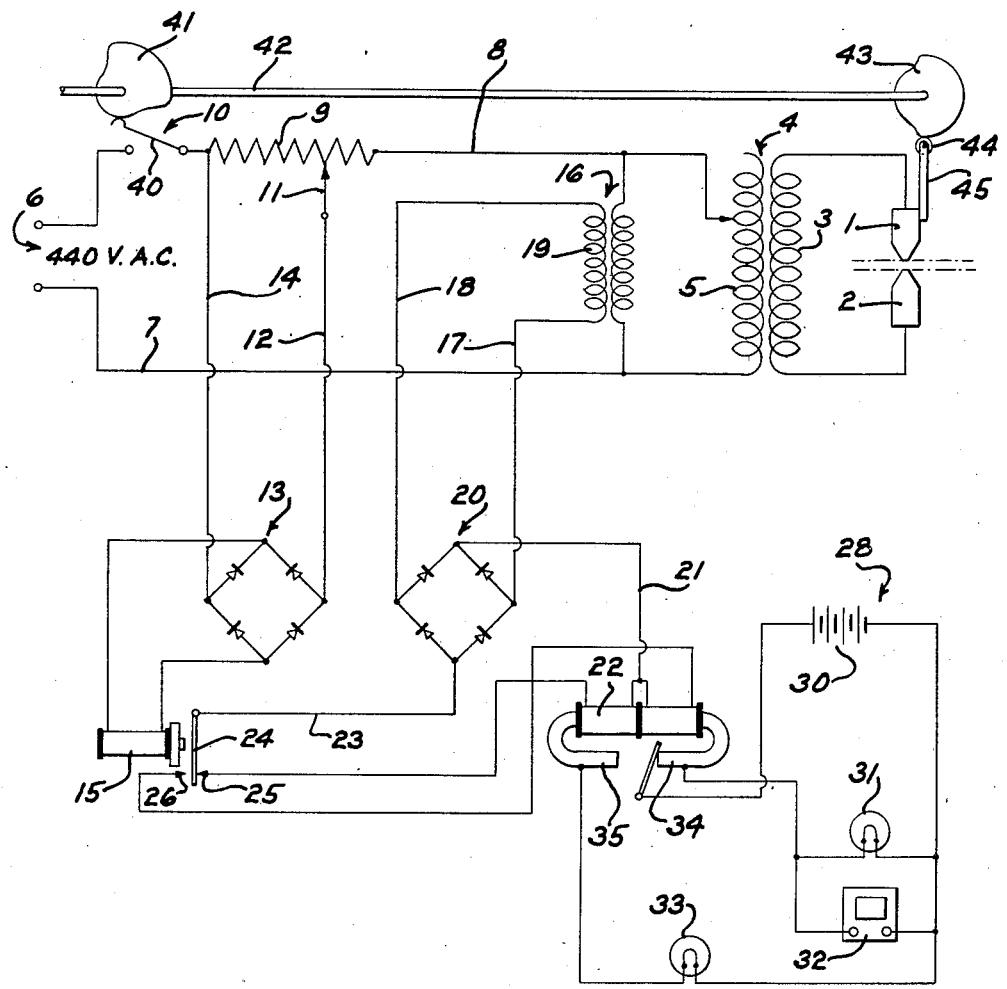
INVENTOR
F. MARTINDELL
BY Harry L. Duft
ATTORNEY Patented Oct. 10, 1944

2,360,068

UNITED STATES PATENT OFFICE 2,360,068

MONITOR CIRCUIT FOR WELDING APPARATUS

Frank Martindell, Western Springs, Ill., assignor to Western Electric Company, Incorporated, New York, N. Y., a corporation of New York Application August 6, 1942, Serial No. 453,902

6 Claims. (Cl. 177—311)

This invention relates to a monitor circuit for a welding apparatus and more particularly to a circuit for indicating the energy expended in performing a contact welding operation.

It is an object of the present invention to provide a simple apparatus for determining the amount of energy supplied to an energy consuming apparatus, such as an electric welder.

In accordance with one embodiment of the invention, an adjustable shunt circuit is connected to a series resistance in the primary circuit of the welding transformer and timer, and a bridging transformer is connected across the primary winding of the welding transformer. The shunt circuit and bridging transformer, through rectifiers, control a relay system including a slow acting relay, which, in turn, controls lights for indicating the strength and duration of the welding current.

A better understanding of the invention may be had by reference to the drawing, wherein the single figure illustrates, diagrammatically, a welding circuit provided with a monitoring circuit made in accordance with the present invention.

In the drawing, a welding circuit is shown including a pair of welding electrodes 1 and 2 connected to the opposite ends of a secondary winding 3 of a welding transformer designated, generally, by the numeral 4. The welding transformer 4 has an adjustable primary winding 5, one side of which is connected directly to a 440 volt A. C. source 6, through a lead 7. The other side of the primary winding 5 of the transformer 4 is connected to the current source 6 through a lead 8, an adjustable potentiometer 9, and a timer 10, which timer is adapted to break the primary circuit to the transformer 4 after a predetermined time interval, as is usual in contact welding circuits.

The timer 10 is shown diagrammatically as a contact member 40 positioned to be operated by a cam 41 on a shaft 42, which also carries a cam 43 for actuating the electrode 1. Cooperating with the cam 43 is a cam roller 44 mounted upon an electrode actuating plunger 45 fixed to and insulated from the electrode 1. By means of this mechanism, the movable welding electrode 1 will be moved into contact with the articles to be welded and will then be supplied with welding current under control of the timer 10. The potentiometer 9 is provided with an adjustable connection 11, which may be positioned to shunt a predetermined amount of current through a lead 12 to a bridge type dry rectifier 13. The end of the potentiometer 9 closest to the 440 volt A. C. source 6 is connected by a lead 14 to the rectifier 13. The rectifier 14 may be of any suitable type, for example, the type of rectifier using crystal or copper oxide discs which will permit passage of current therethrough in one direction to rectify the output thereof. The output leads of the rectifier 13 are connected to the opposite ends of the winding of a slow acting relay 15.

Connected across the leads 7 and 8 to the primary winding 5 of the transformer 4 is a bridging transformer 16 having output leads 17 and 18 from its secondary winding 19 to a bridge type dry rectifier 20, similar to the rectifier 13. One of the output terminals of the rectifier 20 is connected through a lead 21 to the windings of a double wound polarized relay at 22 and the other output terminal of the bridge 20 is connected through a lead 23 to the armature 24 of slow acting relay 15 and through either contact 25 or contact 26 to one of the opposed windings of the relay 22.

A signal circuit, designated generally by the numeral 28, operates under control of the relay 22 and includes the armature 29 of relay 22 which will connect battery at 30 either through a lamp 31 and a buzzer 32 in parallel or through a lamp 33, depending upon the position of the armature 29. The double wound polarized relay 22 is adjusted so that its armature 29 will stick in contact with either contact 34 or 35 when the current to the relay 22 is cut off instead of returning to its center position.

With the above described circuit, the amount of energy expended in making a weld may be checked and will be indicated by the signal circuit 28. When the timer 10 is closed, current will pass from the 440 volt A. C. source 6 through the potentiometer 9, where it is divided, part of it passing to the rectifier 13. The current through the rectifier will be rectified therein and passed through the winding of slow acting relay 15. The relay 15 is one which is selected to have a delay characteristic such that the time required for the relay 15 to attract its armature 24 will depend upon the strength of the current flowing from the 440 volt A. C. circuit to the primary winding 5 of the transformer 4. When the relay 15 is in the condition shown in the drawing, that is, with its armature 24 engaging contact 25, current from the bridging transformer 16 will be rectified by the rectifier 20 and will be connected through the winding of the relay 22, which will remain in the position shown, thereby to supply current from the battery 30 to light the lamp 31 and sound buzzer 32. If, in performing welding operations, the relay 15 is completely energized and attracts its armature 24 before the timer 10 opens, relay 22 will have its opposite winding energized and armature 29 will engage contact 35 to light the lamp 33 and remove the battery supply from lamp 31 and buzzer 32.

When the welding transformer 4 is properly adjusted and the welding electrodes 1 and 2 are effecting satisfactory welds, the relay 15 will be energized before the timer 10 opens the welding circuit and, accordingly, lamp 33 will be lighted after lamp 31 and buzzer 32 have disconnected. However, any decrease in current through the welding circuit, whether due to voltage or resistance variations, will cause the buzzer 32 and lamp 31 to remain lighted due to the fact that relay 15 will not be energized and relay 22 will not shift its contact from the position shown. Thus, the signal circuit 28 will give an indication whether satisfactory welds are being formed due to its indication of the condition of the primary circuit of the transformer.

In adjusting the apparatus for operation, the welding transformer is set to supply the proper current to make satisfactory welds by adjusting the primary 5 and then the adjustable connection 11 is set to have the maximum resistance across its associated rectifier circuit. With the apparatus thus conditioned, the shaft 42 may be started in operation to move the electrode 1 repeatedly up and down to make a series of welded joints between parts being moved between electrodes 1 and 2, current being supplied to the electrodes for a predetermined time as governed by the contour of cam 41 each time articles are clamped between the electrodes 1 and 2.

As the welding proceeds with the apparatus set up as just described, lamp 31 will be extinguished and lamp 33 will be lighted each time a weld is made. However, with this setting of the apparatus, lamp 31 will stay lighted for only a relatively brief time, whereas lamp 33 will be lighted for a relatively long time. The adjustable connection 11 should then be moved to cut down the resistance across the rectifier 13 until the action of the two lamps is irregular on successive welds being made and then the connection 11 should be adjusted so that the lights alternately light in a fairly regular sequence on successive welds. After making this adjustment, the transformer should be adjusted so that its output will be slightly lower and, with that condition prevailing, the lamp 31 should remain lighted. The transformer may now be readjusted to its original position, whereupon the lights 31 and 33 should light alternately on each successive weld. After the apparatus has been thus set, any decrease in current in the welding circuit will be indicated by the signal circuit by the lamp 31 remaining lighted and the buzzer 32 continuing the sound throughout a welding operation.

What is claimed is:

1. A monitoring apparatus for contact welders comprising a welding transformer having primary and secondary windings, a resistor in series with the primary winding of the transformer, a bridging transformer having its primary winding in parallel with the primary winding of the welding transformer, a rectifier shunting a part of the resistor, a rectifier connected to the secondary of the bridging transformer, and means controlled by said rectifiers jointly for indicating the energy expended by the welder in making a weld.

2. A monitoring apparatus for contact welders comprising a welding transformer having primary and secondary windings, a resistor in series with the primary winding of the transformer, a bridging transformer having its primary winding in parallel with the primary winding of the welding transformer, a rectifier shunting a part of the resistor, a second rectifier connected to the secondary of the bridging transformer, a circuit including a slow acting relay operable by one of said rectifiers if a predetermined current flows in the circuit of the rectifier for a predetermined time, and means controlled by said relay for indicating that the proper amount of energy is expended by the welder in making a weld.

3. A monitoring apparatus for contact welders comprising a welding transformer having primary and secondary windings, a resistance in series with the primary winding of the welding transformer, a bridging transformer across the primary winding of the welding transformer, a rectifier across a part of the resistance, a second rectifier connected to the secondary of the bridging transformer, and a circuit including a slow acting relay operable by one of said rectifiers if a predetermined current flows in the circuit of the rectifier for a predetermined time, a double wound polarized relay selectively operable by the other rectifier, and means under control of the double wound relay for indicating whether or not the proper amount of energy is expended by the welder in making a weld.

4. In a welding circuit, a transformer, a current source for supplying the primary winding of said transformer, a timer between said source and the primary winding of the transformer, a resistance connected in series with said timer, a rectifier connected across a part of said resistance, a relay connected to the output of said rectifier, said relay having a predetermined delay characteristic that renders it operative after a predetermined amount of current has been applied to it for a predetermined time, a bridging transformer connected across said primary winding, a rectifier connected to the secondary of said bridging transformer, a double wound polarized relay having one end of each winding connected to the output side, means controlled by the shunt circuit for controlling the energization of said double wound relay, and signal means operable under control of the double wound relay.

5. In a welding circuit, a welding transformer, circuit connections for supplying current to the primary winding of said transformer, means connected in the circuit connections to the primary winding of said transformer and responsive to the current flow therethrough, a bridging transformer connected across the primary winding of said transformer, a full wave rectifier connected to the output of said bridging transformer, a polarized double wound relay connected to the output of the rectifier under control of said current responsive means, and means operable under control of the polarized relay for indicating a value of the current flowing in the primary winding of the welding transformer.

6. In a welding circuit, a welding transformer having primary and secondary windings, current supply means for supplying current to the primary winding of said transformer, a resistance in series with said current supply means, a rectifier connected across a part of said resistance, a retarded relay connected across the output of said rectifier to be energized when a predetermined amount of current has been passed to the welding transformer's primary winding, and means under control of said retarded relay for indicating its time of energization.

FRANK MARTINDELL.